(12) United States Patent
Lee et al.

(10) Patent No.: US 8,958,909 B2
(45) Date of Patent: Feb. 17, 2015

(54) WALKING ROBOT AND CONTROL METHOD THEREOF

(75) Inventors: Min Hyung Lee, Anyang-si (KR);
Kyung Shik Roh, Seongnam-si (KR);
Woong Kwon, Seongnam-si (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 476 days.

(21) Appl. No.: 13/279,633

(22) Filed: Oct. 24, 2011

(65) Prior Publication Data

US 2012/0158175 A1    Jun. 21, 2012

(30) Foreign Application Priority Data

Dec. 21, 2010 (KR) .................. 10-2010-0131259

(51) Int. Cl.
*B25J 9/18* (2006.01)
*B25J 17/00* (2006.01)
*B62D 57/032* (2006.01)
*B25J 9/16* (2006.01)

(52) U.S. Cl.
CPC .............. *B62D 57/032* (2013.01); *B25J 9/162* (2013.01); *G05B 2219/40244* (2013.01); *G05B 2219/40264* (2013.01)
USPC ........... 700/252; 700/245; 700/247; 700/250; 700/261

(58) Field of Classification Search
USPC ......... 700/245, 247, 250, 252, 253, 255, 257, 700/261
See application file for complete search history.

(56) References Cited

U.S. PATENT DOCUMENTS

| 8,498,743 | B2* | 7/2013 | Kwak et al. | 700/245 |
| 8,612,054 | B2* | 12/2013 | Kwon | 700/261 |
| 2008/0275831 | A1* | 11/2008 | Reil | 706/23 |
| 2010/0185330 | A1* | 7/2010 | Kwon | 700/261 |
| 2010/0277483 | A1* | 11/2010 | Lee et al. | 345/474 |

FOREIGN PATENT DOCUMENTS

KR    10-2011-0082711    7/2011

OTHER PUBLICATIONS

Yin et al., "SIMBICON: Simple Biped Locomotion Control," Aug. 2008, Proc. ACM SIGGRAPH.*

(Continued)

*Primary Examiner* — Thomas G Black
*Assistant Examiner* — Sara Nelson
(74) *Attorney, Agent, or Firm* — Harness, Dickey & Pierce, P.L.C.

(57) ABSTRACT

A walking robot and a control method thereof. The control method includes storing angle change data according to time corresponding to at least one joint unit of the robot using human walking data, extracting reference knot points from the angle change data according to time, and generating a reference walking trajectory using the extracted reference knot points, calculating a walking change factor to perform change between walking patterns of the robot, generating a target walking trajectory through an arithmetic operation between the reference walking trajectory and the calculated walking change factor, calculating a control torque to track the generated target walking trajectory, and transmitting the calculated control torque to the at least one joint unit so as to control walking of the robot, thereby achieving various walking patterns through a comparatively simple arithmetic operation process.

26 Claims, 15 Drawing Sheets

(56) References Cited

OTHER PUBLICATIONS

Hasegawa et al., "Trajectory generation for biped locomotion robot," 2000, Mechatronics.*

Furuta et al., "Design and construction of a series of compact humanoid robots and development of biped walk control strategies," 2001, Robotics and Autonomous Systems.*

Yin et al., SIMBICON: Simple Biped Locomotion Control, Aug. 2008, Proc. ACM SIGGRAPH.*

Hasegawa et al., Trajectory generation for biped locomotion robot, 2000, Mechatronics.*

Furuta et al., Design and construction of a series of compact humanoid robots and development of biped walk control strategies, 2001, Robotics and Autonomous Systems.*

* cited by examiner

WALKING ROBOT AND CONTROL METHOD THEREOF

CROSS-REFERENCE TO RELATED APPLICATIONS

This application claims the benefit of Korean Patent Application No. 2010-0131259, filed on Dec. 21, 2010 in the Korean Intellectual Property Office, the disclosure of which is incorporated herein by reference.

BACKGROUND

1. Field

Embodiments relate to a torque-based walking robot, which controls various walking attitudes, and a control method thereof.

2. Description of the Related Art

Research and development of walking robots which have a joint system similar to that of humans and coexist with humans in human working and living spaces is actively progressing. The walking robots are multi-legged walking robots having a plurality of legs, such as two or three legs or more, and in order to achieve stable walking of a robot, actuators, such as electric motors or hydraulic motors, located at respective joints of the robot need to be driven. As methods to drive these actuators, there are a position-based Zero Moment Point (hereinafter, referred to as ZMP) control method in which command angles of respective joints, i.e., command positions, are given and the joints are controlled so as to track the command positions, and a torque-based Finite State Machine (hereinafter, referred to as FSM) control method in which command torques of respective joints are given and the joints are controlled so as to track the command torques.

In the ZMP control method, a walking direction, a walking stride and a walking velocity of a robot are set in advance so as to satisfy a ZMP constraint. A ZMP constraint may be, for example, a condition that a ZMP is present in a safety region within a support polygon formed by supporting leg(s) (if the robot is supported by one leg, this means the region of the leg, and if the robot is supported by two legs, this means a region set to have a small area within a convex polygon including the regions of the two legs in consideration of safety). In the ZMP control method, walking patterns of the respective legs corresponding to the set factors are created, and walking trajectories of the respective legs are calculated based on the walking patterns. Further, angles of joints of the respective legs are calculated through inverse kinematics of the calculated walking trajectories, and target control values of the respective joints are calculated based on current positions and target positions of the respective joints. Moreover, servo control allowing the respective legs to track the calculated walking trajectories per control time is carried out. That is, during walking of the robot, whether or not positions of the respective joints precisely track the walking trajectories according to the walking patterns is detected, and if it is detected that the respective legs deviate from the walking trajectories, torques of the motors are adjusted so that the respective legs precisely track the walking trajectories.

However, the ZMP control method is a position-based control method and thus achieves precise position control, but needs to perform precise angle control of the respective joints in order to control the ZMP and thus requires high servo gain. Thereby, the ZMP control method requires high current and thus has low energy efficiency and high stiffness of the joints, thereby applying high impact to a surrounding environment. Further, the ZMP control method needs to avoid kinematic singularities in order to calculate angles of the respective joints, thereby causing the robot to take a pose with knees bent at all times during walking and thus to have an unnatural gait differing from that of a human.

On the other hand, in the FSM control method, instead of tracking positions per control time, a finite number of operating states of a robot is defined in advance, target torques of respective joints are calculated with reference to the respective operating states during walking, and the joints are controlled so as to track the target torques. Such an FSM control method controls torques of the respective joints during walking and thus requires low servo gain, thereby attaining high energy efficiency and low stiffness of the joints and thus being safe with respect to a surrounding environment. Further, the FSM control method does not need to avoid kinematic singularities, thereby causing the robot to have a natural gait with stretched knees similar to that of a human.

However, the FSM control method controls walking of the robot depending on the finite number of operating states, defined in advance, and thus does not achieve proper control of walking of the robot, thereby causing the robot to lose balance. Therefore, the FSM control method requires a separate balancing motion to keep the robot balanced regardless of walking motions of the robot. For this purpose, command torques allowing the robot to be stably balanced so as to perform the balancing motion of the robot need to be calculated. In order to calculate the command torques, a complex dynamic equation needs to be solved. Thus, the FSM control method is not substantially applied to a robot having legs with 6 degrees of freedom now.

SUMMARY

Therefore, it is an aspect of an embodiment to provide a walking robot, in which reference walking trajectories are generated based on walking data of a human and various walking patterns are achieved using the reference walking trajectories and a walking change factor, and a control method thereof.

Additional aspects of embodiments will be set forth in part in the description which follows and, in part, will be obvious from the description, or may be learned by practice of the embodiments.

In accordance with an aspect of an embodiment, a control method of a walking robot, which has at least one joint unit provided on each leg of the robot, includes storing angle change data according to time corresponding to the at least one joint unit in advance using human walking data, extracting reference knot points from the angle change data according to time, and generating a reference walking trajectory of the robot using the extracted reference knot points, calculating a walking change factor to perform change between walking patterns of the robot, generating a target walking trajectory by carrying out an arithmetic operation between the reference walking trajectory and the calculated walking change factor, calculating a control torque to track the generated target walking trajectory, and transmitting the calculated control torque to the at least one joint unit so as to control walking of the robot.

The walking change factor may include a scale factor to change a walking stride of the robot and a walking cycle to change a walking velocity of the robot.

The generation of the target walking trajectory may include calculating target knot points by carrying out an arithmetic operation between the reference knot points and the scale factor and generating the target walking trajectory by connecting the calculated target knot points by a spline.

The calculation of the target knot points may be carried out by dividing the reference knot points by the scale factor.

The at least one joint unit provided on each leg may include a hip joint unit, a knee joint unit and an ankle joint unit, and the scale factor may be set with respect to each of the hip joint unit, the knee joint unit and the ankle joint unit.

The scale factor may be set so that the changed walking stride is greater than the minimum walking stride of the robot.

The reference walking trajectory of the robot may be generated by connecting the extracted reference knot points by a spline.

In accordance with another aspect of an embodiment, a control method of a walking robot, which has at least one joint unit provided on each leg of the robot, includes storing angle change data according to time corresponding to the at least one joint unit in advance using human walking data, extracting reference knot points from the angle change data according to time, generating a reference walking trajectory of the robot using the extracted reference knot points, and storing the reference walking trajectory in advance, calculating walking change factors in respective walking patterns to perform change between the walking patterns of the robot and storing the walking change factors in advance, receiving a command instructing the robot to perform change from the current walking pattern of the robot to another walking pattern from a user, generating a target walking trajectory to perform change from the current walking pattern of the robot to the received walking pattern by carrying out an arithmetic operation between the reference walking trajectory and the walking change factor corresponding to the received walking pattern, calculating a control torque to track the generated target walking trajectory, and transmitting the calculated control torque to the at least one joint unit so as to control walking of the robot.

Each of the walking change factors may include a scale factor to change a walking stride of the robot and a walking cycle to change a walking velocity of the robot.

The generation of the target walking trajectory may include calculating target knot points by carrying out an arithmetic operation between the reference knot points and the scale factor and generating the target walking trajectory by connecting the calculated target knot points by a spline.

The calculation of the target knot points may be carried out by dividing the reference knot points by the scale factor.

The at least one joint unit provided on each leg may include a hip joint unit, a knee joint unit and an ankle joint unit, and the scale factor may be set with respect to each of the hip joint unit, the knee joint unit and the ankle joint unit.

The scale factor may be set so that the changed walking stride is greater than the minimum walking stride of the robot.

The reference walking trajectory of the robot may be generated by connecting the extracted reference knot points by a spline.

In accordance with another aspect of an embodiment, a walking robot includes at least one joint unit provided on each leg of the robot, a memory unit to store angle change data according to time corresponding to the at least one joint unit in advance using human walking data, a knot point extraction unit to extract reference knot points from the angle change data according to time, a reference walking trajectory generation unit to generate a reference walking trajectory of the robot using the reference knot points extracted by the knot point extraction unit, a walking change factor calculation unit to calculate a walking change factor to perform change between walking patterns of the robot, a target walking trajectory generation unit to generate a target walking trajectory by carrying out an arithmetic operation between the reference walking trajectory and the calculated walking change factor, a control torque calculation unit to calculate a control torque to track the generated target walking trajectory, and a servo control unit to transmit the calculated control torque to the at least one joint unit so as to control walking of the robot.

The walking change factor calculation unit may calculate a scale factor to change a walking stride of the robot and a walking cycle to change a walking velocity of the robot.

The target walking trajectory generation unit may calculate target knot points by carrying out an arithmetic operation between the reference knot points and the scale factor and generate the target walking trajectory by connecting the calculated target knot points by a spline.

The target walking trajectory generation unit may calculate the target knot points by dividing the reference knot points by the scale factor.

The at least one joint unit provided on each leg may include a hip joint unit, a knee joint unit and an ankle joint unit, and the walking change factor calculation unit may calculate the scale factor of each of the hip joint unit, the knee joint unit and the ankle joint unit.

The walking change factor calculation unit may set the scale factor so that the changed walking stride is greater than the minimum walking stride of the robot.

In accordance with a further aspect of an embodiment, a walking robot includes a user interface unit to receive a command instructing the robot to perform change from the current walking pattern of the robot to another walking pattern from a user, at least one joint unit provided on each leg of the robot, a memory unit to store angle change data according to time corresponding to the at least one joint unit using human walking data, a knot point extraction unit to extract reference knot points from the angle change data according to time, a reference walking trajectory generation unit to generate a reference walking trajectory of the robot using the extracted reference knot points and to transmit the generated reference walking trajectory to the memory unit so that the generated reference walking trajectory is stored in the memory unit, a walking change factor calculation unit to calculate walking change factors in respective walking patterns to perform change between the walking patterns of the robot and to transmit the walking change factors to the memory unit so that the walking change factors are stored in the memory unit, a target walking trajectory generation unit to generate a target walking trajectory to perform change from the current walking pattern of the robot to the walking pattern received from the user interface unit by carrying out an arithmetic operation between the reference walking trajectory and the walking change factor corresponding to the received walking pattern, a control torque calculation unit to calculate a control torque to track the generated target walking trajectory, and a servo control unit to transmit the calculated control torque to the at least one joint unit so as to control walking of the robot.

The walking change factor calculation unit may calculate scale factors in the respective walking patterns to change a walking stride of the robot and walking cycles in the respective walking patterns to change a walking velocity of the robot.

The at least one joint unit provided on each leg may include a hip joint unit, a knee joint unit and an ankle joint unit, and the walking change factor calculation unit may calculate the scale factor of each of the hip joint unit, the knee joint unit and the ankle joint unit.

The walking change factor calculation unit may set the scale factor so that the changed walking stride is greater than the minimum walking stride of the robot.

The target walking trajectory generation unit may calculate target knot points by carrying out an arithmetic operation between the reference knot points and the scale factor and generate the target walking trajectory by connecting the calculated target knot points by a spline.

The target walking trajectory generation unit may calculate the target knot points by dividing the reference knot points by the scale factor.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
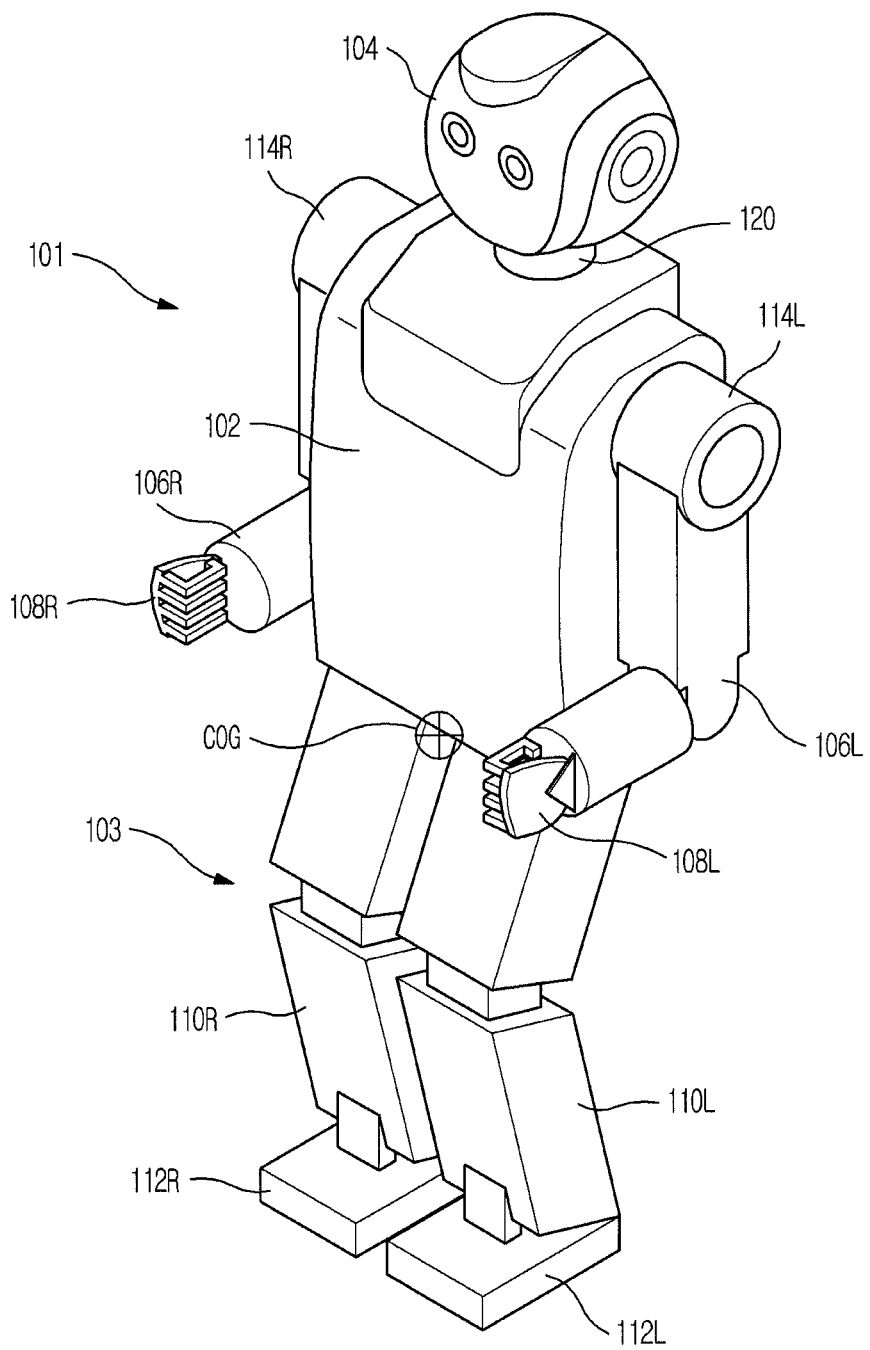
FIG. 1 is a view illustrating an external appearance of a walking robot in accordance with an embodiment.

Reference will now be made in detail to embodiments, examples of which are illustrated in the accompanying drawings, wherein like reference numerals refer to like elements throughout.

FIG. 1 is a view illustrating an external appearance of a walking robot in accordance with an embodiment.

As shown in FIG. 1, a robot 100 is a bipedal walking robot, which walks erect with two legs 110 in the same manner as a human, and includes an upper body 101 including a torso 102, a head 104 and arms 106R and 106L, and a lower body 103 including the two legs 110R and 110L.

The upper body 101 of the robot 100 includes the torso 102, the head 104 connected to the upper portion of the torso 102 through a neck 120, the two arms 106R and 106L connected to both sides of the upper portion of the torso 102 through shoulders 114R and 114L, and hands 108R and 108L respectively connected to tips of the two arms 106R and 106L.

The lower body 103 of the robot 100 includes the two legs 110R and 110L connected to both sides of the lower portion of the torso 102 of the upper body 101, and feet 112R and 112L respectively connected to tips of the two legs 110R and 110L.

Here, "R" and "L" respectively indicate the right and left sides of the robot 100, and "COG" indicates the center of gravity of the robot 100.

Figure 2:
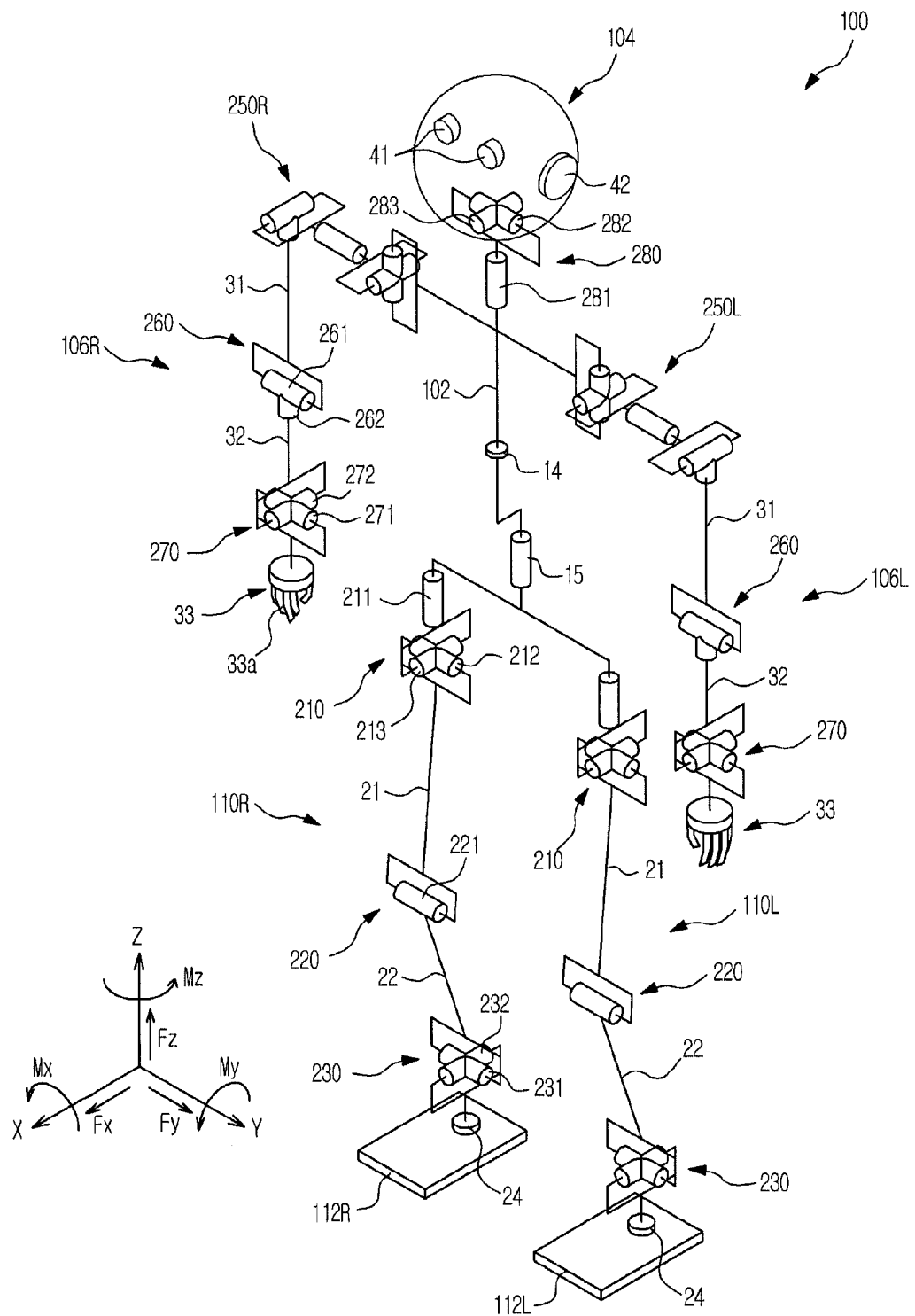
FIG. 2 is a view illustrating structures of main joints of the robot shown in FIG. 1.

FIG. 2 is a view illustrating structures of main joints of the robot shown in FIG. 1.

As shown in FIG. 2, a pose sensor 14 is installed on the torso 102 of the robot 100. The pose sensor 14 detects tilt angles of the upper body 101 and the two legs 110R and 110L with respect to a vertical axis and angular velocities thereof and then generates pose data. The pose sensor 14 may be installed on the two legs 110L and 110R as well as on the upper body 101.

A waist joint unit 15 having 1 degree of freedom in the yaw direction so as to allow the upper body 101 to be rotated is installed on the torso 102.

Further, cameras 41 to capture surrounding images and microphones 42 to receive a user's voice are installed on the head 104 of the robot 100.

The head 104 is connected to the torso 102 of the upper body 101 through a neck joint unit 280. The neck joint unit 280 includes a rotary joint 281 in the yaw direction (rotated around the Z-axis), a rotary joint 282 in the pitch direction (rotated around the Y-axis) and a rotary joint 283 in the roll direction (rotated around the X-axis), and thus has 3 degrees of freedom.

Motors (for example, actuators such as electric motors and hydraulic motors) to rotate the head 104 are connected to the respective rotary joints 281, 282 and 283 of the neck joint unit 280.

The two arms 106R and 106L of the robot 100 respectively include upper arm links 31, lower arm links 32 and hands 33.

The upper arm links 31 of the two arms 106R and 106L are connected to the upper body 101 through shoulder joint units 250R and 250L, the upper arm links 31 and the lower arm links 32 of the two arms 106R and 106L are connected to each other through elbow joint units 260, and the lower arm links 32 and the hands 33 of the two arms 106R and 106L are connected to each other through wrist joint units 270.

The shoulder joint units 250R and 250L are installed at both sides of the torso 102 of the upper body 101 and connect the two arms 106R and 106L to the torso 102 of the upper body 101.

Each elbow joint unit 260 includes a rotary joint 261 in the pitch direction and a rotary joint 262 in the yaw direction, and thus has 2 degrees of freedom.

Each wrist joint unit 270 includes a rotary joint 271 in the pitch direction and a rotary joint 272 in the roll direction, and thus has 2 degrees of freedom.

Each hand 33 is provided with five fingers 33a. A plurality of joints (not shown) driven by motors may be installed on the respective fingers 33a. The fingers 33a perform various motions, such as gripping of an article or pointing in a specific direction, in connection with movement of the arms 106R and 106L.

The two legs 110R and 110L of the robot 100 respectively include thigh links 21, calf links 22 and the feet 112R and 112L.

The thigh links 21 of the two legs 110R and 110L correspond to the thighs of a human and are connected to the torso 102 of the upper body 102 through hip joint units 210, the thigh links 21 and the calf links 22 of the two legs 110R and 110L are connected to each other through knee joint units 220, and the calf links 22 and the feet 112R and 112L of the two legs 110R and 110L are connected to each other through ankle joint units 230.

Each hip joint unit 210 includes a rotary joint 211 in the yaw direction (rotated around the Z-axis), a rotary joint 212 in the pitch direction (rotated around the Y-axis) and a rotary joint 213 in the roll direction (rotated around the X-axis), and thus has 3 degrees of freedom.

Each knee joint unit 220 includes a rotary joint 221 in the pitch direction, and thus has 1 degree of freedom.

Each ankle joint unit 230 includes a rotary joint 231 in the pitch direction and a rotary joint 232 in the roll direction, and thus has 2 degrees of freedom.

Since 6 rotary joints of the hip joint units 210, the knee joint units 220 and the ankle joint units 230 are provided to each of the two legs 110R and 110L, a total of 12 rotary joints is provided to the two legs 110R and 110L.

Multi-Axis Force/Torque (F/T) sensors 24 are respectively installed between the feet 112R and 112L and the ankle joint units 230 of the two legs 110R and 110L. the F/T sensors 24 measure three directional components Fx, Fy, and Fz of force and three directional components Mx, My, and Mz of moment transmitted from the feet 112R and 112L, thereby detecting whether or not the feet 112R and 112L contact the ground or loads applied to the feet 112R and 112L.

Actuators, such as motors (not shown), to drive the respective rotary joints are provided on the robot 100. A walking control unit to control the overall operation of the robot 100 properly controls these motors, thereby achieving various motions of the robot 100.

Figure 3:
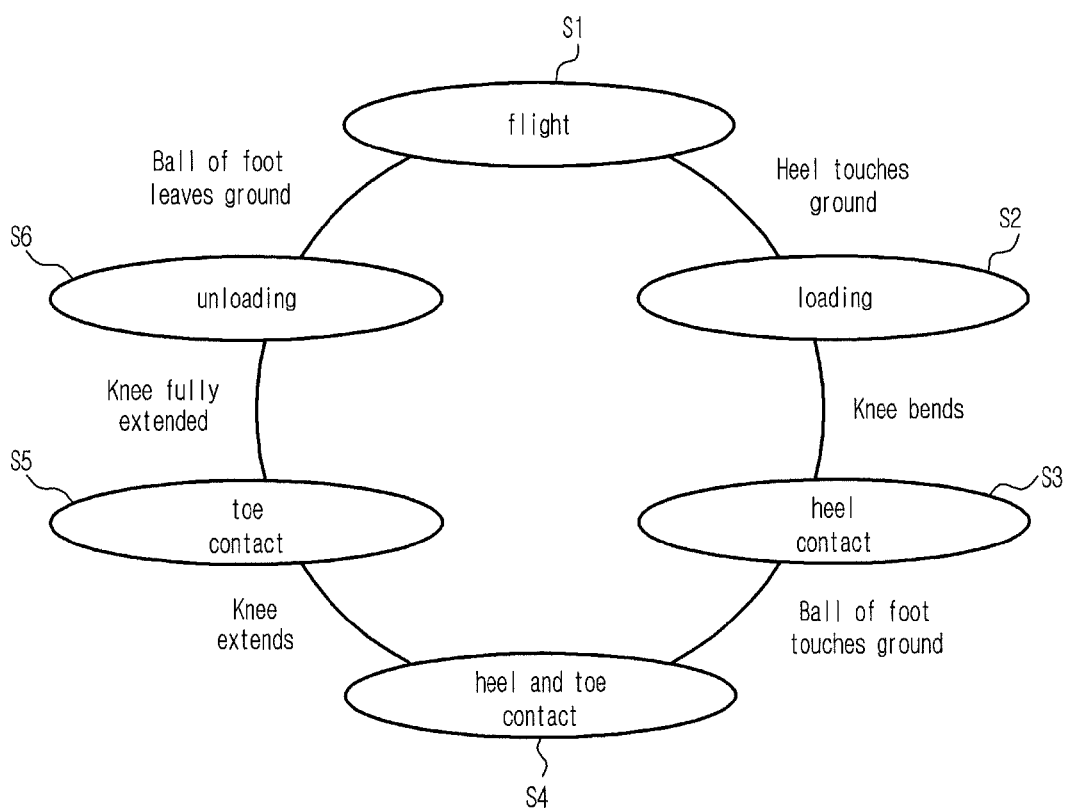
FIG. 3 is a view illustrating operating states of the robot and control actions of the respective operating states during FSM-based walking.

FIG. 3 is a view illustrating operating states of the robot and control actions of the respective operating states during FSM-based walking.

With reference to FIG. 3, in the torque-based FSM control method, operation of the robot 100 is divided into a plurality of operating states (for example, 6 states—S1, S2, S3, S4, S5, and S6), which are defined in advance. The respective operating states S1, S2, S3, S4, S5, and S6 indicate poses of one leg 110R or 110L of the robot 100 during walking, and stable walking of the robot 100 is achieved by proper transition between such poses of the robot 100.

Further, one walking motion is achieved through these operating states S1, S2, S3, S4, S5, and S6 and transition between the operating states S1, S2, S3, S4, S5, and S6.

The first operating state (flight state) S1 corresponds to a pose of swinging the leg 110L or 110R, the second operating state (loading state) S2 corresponds to a pose of loading the foot 112 on the ground, the third operating state (heel contact state) S3 corresponds to a pose of bringing the heel of the foot 112 into contact with the ground, the fourth operating state (heel and toe contact state) S4 corresponds to a pose of bringing both the heel and the toe of the foot 112 into contact with the ground, the fifth operating state (toe contact state) S5 corresponds to a pose of bringing the toe of the foot 112 into contact with the ground, and the sixth operating state (unloading state) S6 corresponds to a pose of unloading the foot 112 from the ground.

In order to transition from one operating state to another operating state, a control action to achieve such transition is required.

In more detail, if the first operating state S1 transitions to the second operating state S2 (S1→S2), a control action in which the heel of the foot 112 touches the ground is required.

If the second operating state S2 transitions to the third operating state S3 (S2→S3), a control action in which the knee (particularly, the knee joint unit) of the foot 112 touching the ground bends is required.

If the third operating state S3 transitions to the fourth operating state S4 (S3→S4), a control action in which the ball of the foot 112 touches the ground is required.

If the fourth operating state S4 transitions to the fifth operating state S5 (S4→S5), a control action in which the knee of the foot 112 touching the ground extends is required.

If the fifth operating state S5 transitions to the sixth operating state S6 (S4→S5), a control action in which the knee of the foot 112 touching the ground fully extends is required.

If the sixth operating state S6 transitions to the first operating state S1 (S6→S1), a control action in which the ball of the foot 112 leaves the ground is required.

Therefore, in order to perform the control actions, the robot 100 calculates torque commands of the respective joints corresponding to the respective control actions, and outputs the calculated torque commands to the actuators, such as the motors, installed on the respective joints to drive the actuators.

In such a torque-based FSM control method, walking of the robot 100 is controlled depending on the operating states S1, S2, S3, S4, S5, and S6, defined in advance. However, various walking attitudes suitable to the current walking state of the robot are not achieved only through transition between the operating states S1, S2, S3, S4, S5, and S6.

Therefore, in the torque-based FSM control method in accordance with an embodiment, target walking trajectories are generated by applying a waking change factor to achieve various walking attitudes to reference walking trajectories calculated based on walking data of a human.

Hereinafter, a control method of a robot in accordance with embodiments, which controls various walking attitudes of the robot according to the current walking state and achieves a natural gait of the robot in the same manner as that of a human, will be described with reference to FIGS. 4 to 12.

Figure 4:
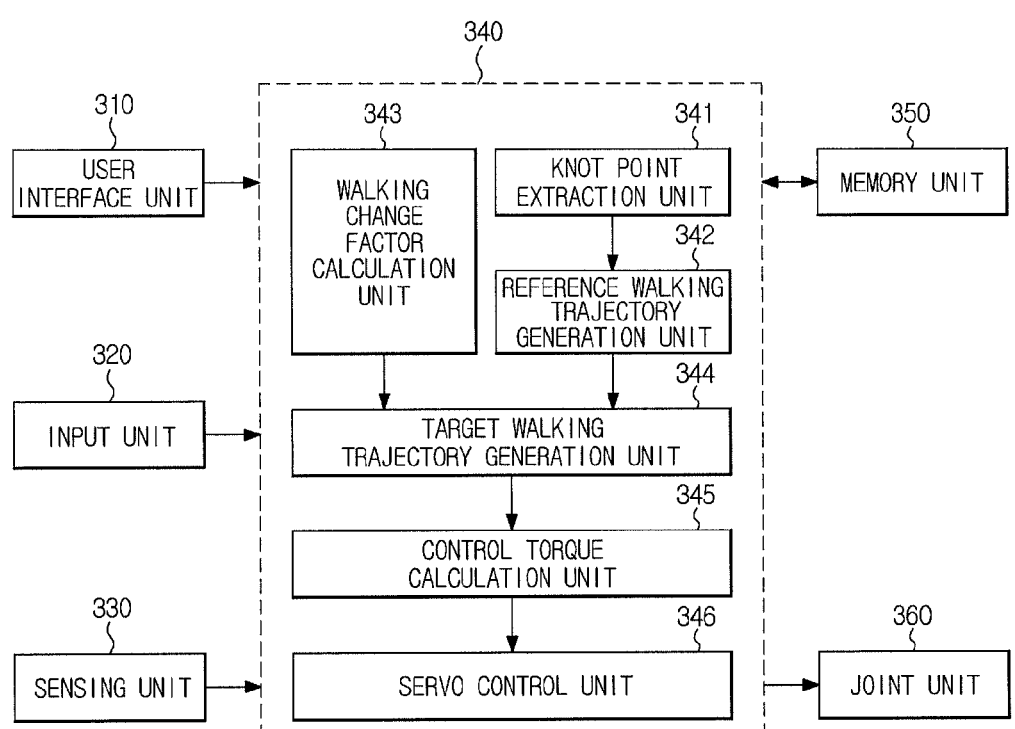
FIG. 4 is a control block diagram of the walking robot in accordance with an embodiment.

FIG. 4 is a control block diagram of a walking robot in accordance with an embodiment. The walking robot includes a user interface unit 310, an input unit 320, a sensing unit 330, a walking control unit 340, a memory unit 350, and joint units 360.

The user interface unit 310 receives a user command instructing the robot to walk.

In more detail, the user interface unit 310 receives a command instructing the robot to perform change between walking patterns of the robot from a user. That is, the user selects a proper walking pattern according to the current walking state of the robot sensed by the sensing unit 330, and inputs the selected walking pattern to the user interface unit 310 so as to perform change from the current walking pattern to the selected walking pattern.

The input unit 320 receives human walking data and transmits the human walking data to the memory unit 350 so that the human walking data are stored in the memory unit 350. The human walking data are obtained using motion capture equipment, and are used as basic data to extract angle data in standard walking according to time.

The sensing unit 330 senses the current walking state of the robot and transmits the walking data to the walking control unit 340 so as to transition from the current walking pattern to the walking pattern suitable to the sensed current walking state.

The sensing unit 330 senses angle changes of the hip joint units, the knee joint units and the ankle joint units according to time and senses an environment around the robot.

Figure 5A:
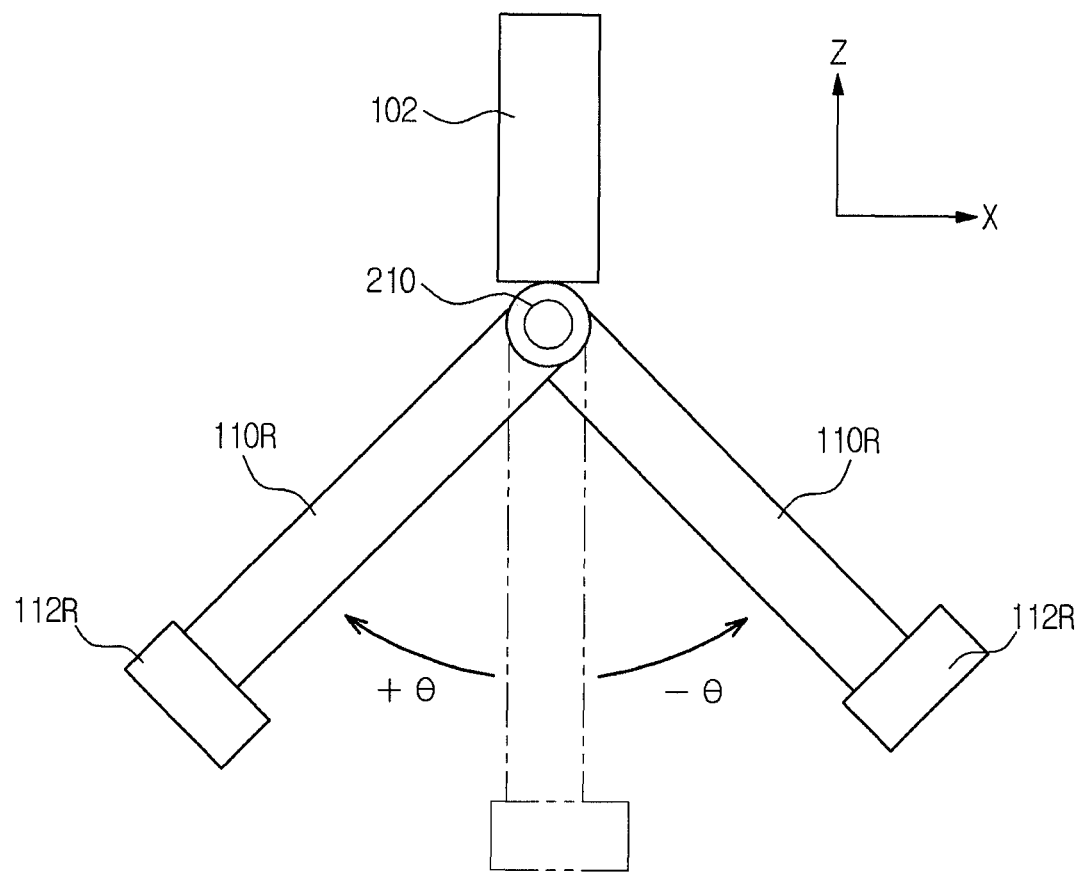
FIG. 5A is a view illustrating measurement of a rotating angle of a hip joint unit.
Figure 5B:
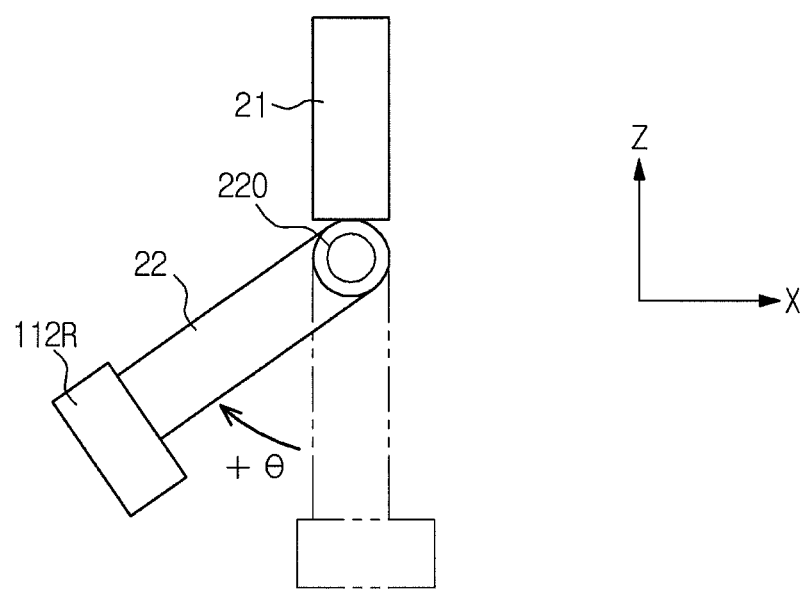
FIG. 5B is a view illustrating measurement of a rotating angle of a knee joint unit.
Figure 5C:
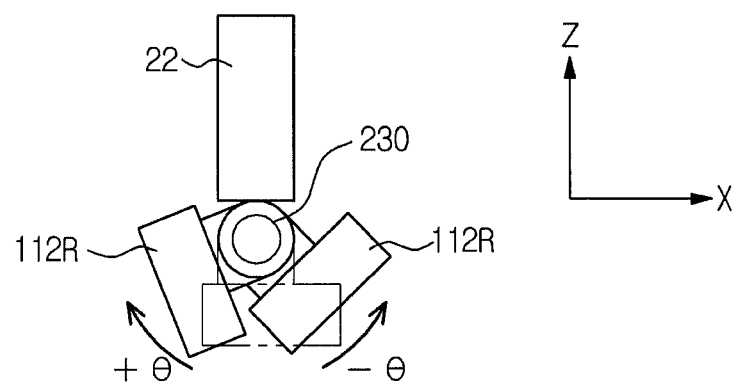
FIG. 5C is a view illustrating measurement of a rotating angle of an ankle joint unit.

Hereinafter, methods to measure rotating angles of the respective joint units will be described with reference to FIGS. 5A to 5C. FIGS. 5A, 5B and 5C illustrate measurement of rotating angles of the hip joint unit, the knee joint unit and the ankle joint unit, as seen from the side of the robot. With reference to FIGS. 5A, 5B and 5C, it may be seen that the rotating angles of the respective joint units in the pitch direction with respect to the vertical axis are measured and the rotating angle of the knee joint unit is obtained only in the positive direction (+θ).

The walking control unit 340 changes the current walking pattern of the robot based on the walking pattern received from the user interface unit 310 or the current walking state of the robot sensed by the sensing unit 330.

Such a walking control unit 340 includes a knot point extraction unit 341, a reference walking trajectory generation unit 342, a walking change factor calculation unit 343, a target walking trajectory generation unit 344, a control torque calculation unit 345 and a servo control unit 346.

The knot point extraction unit 341 extracts reference knot points from angle change data of the respective joint units 360 according to time, which are stored in the memory unit 350, and transmits the extracted reference knot points to the reference walking trajectory generation unit 342. The reference knot points are angle commands of the respective joint units 360 to perform an operating state, and respective reference knot points correspond to respective operating states.

The reference walking trajectory generation unit 342 generates reference walking trajectories of the robot by smoothly connecting the reference knot points extracted by the knot point extraction unit 341 by splines. The generated reference walking trajectories are transmitted to and stored in the memory unit 350.

The walking change factor calculation unit 343 calculates a walking change factor to achieve various walking patterns of the robot. Such a walking change factor includes a scale factor to change a walking stride, and a walking cycle to change a walking velocity.

The scale factor is a value to change the magnitude of the joint angle in the reference walking trajectory, and is set to be smaller than a value stored in advance in the memory unit 350. The scale factor is used to obtain the minimum swing angle of a foot lifted from the ground.

Further, the walking change factor calculation unit 343 calculates a walking change factor corresponding to walking pattern data and transmits the calculated walking change factor together with the walking pattern data to the memory unit 350. For example, the walking change factor calculation unit 343 transmits a scale factor and a walking cycle corresponding to data of a first walking pattern to the memory unit 350 so that the scale factor and the walking cycle together with the first walking pattern are stored in the memory unit 350.

The target walking trajectory generation unit 344 generates target walking trajectories by carrying out an arithmetic operation between the walking change factor, calculated by the walking change factor calculation unit 343, and the reference walking trajectories. In more detail, if walking stride of the robot is changed, the target walking trajectory generation unit 344 calculates target knot points by carrying out an arithmetic operation between the scale factor and the reference knot points, and then generates the target walking trajectories by connecting the calculated target knot points by splines.

The generated target walking trajectories to achieve various walking patterns are transmitted to the control torque calculation unit 345, and the control torque calculation unit 345 outputs torques to track the target walking trajectories to the joint units 360.

The control torque calculation unit 345 calculates control torques to track the target walking trajectories of the respective joint units 360 generated by the target walking trajectory generation unit 344. Such a calculation is carried out each control cycle, and the control cycle is set to 1 ms.

The servo control unit 346 supplies the control torques, calculated by the control torque calculation unit 345, to the joint units 360 of the legs, and outputs torque control signals corresponding to the calculated control torques to the joint units 360 so as to drive actuators, such as motors, installed on the joint units 360.

Therefore, the joint units 360 receive the torque control signals from the servo control unit 346 and then the actuators, such as the motors, installed on the joint units 360 are driven. Thereby, the robot may achieve natural and various walking patterns based on the target walking trajectories of the respective joint units 360.

Figure 6:
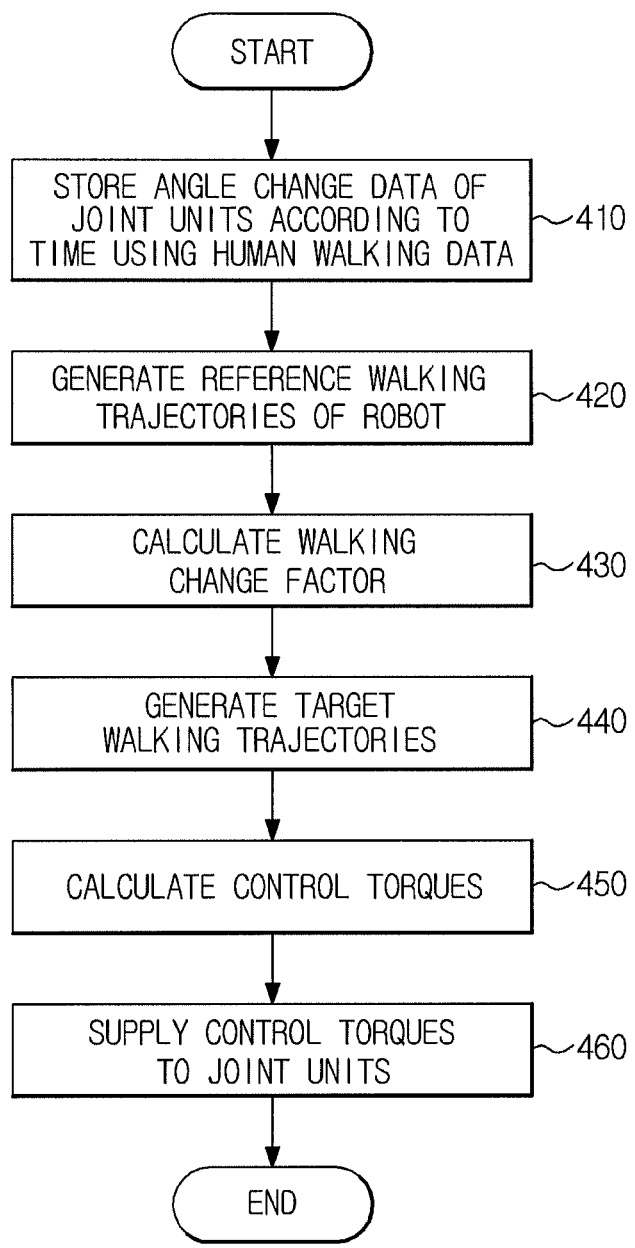
FIG. 6 is a flow chart illustrating a control method of a robot in accordance with another embodiment.
Figure 7:
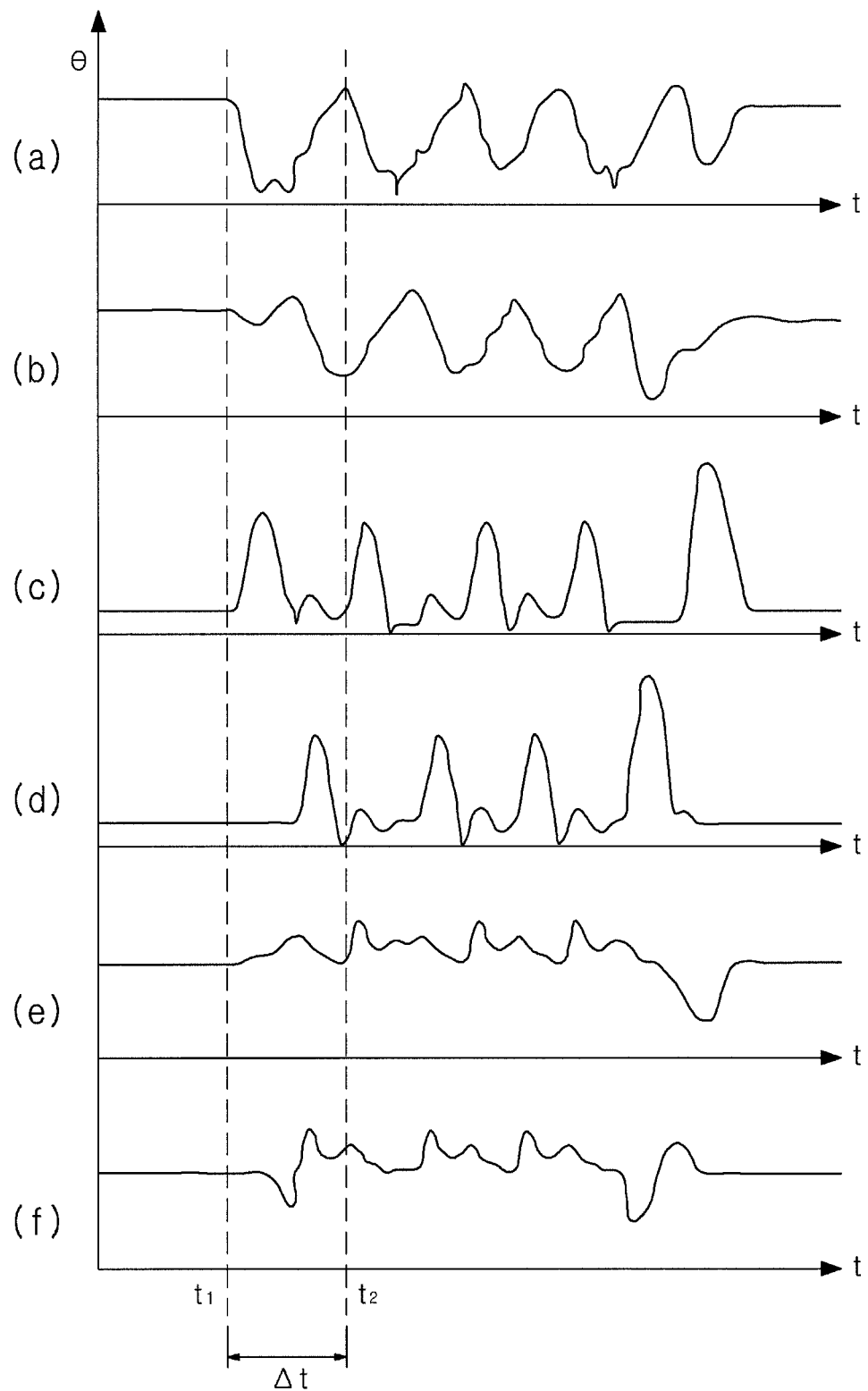
FIGS. 7(a) to 7(f) are graphs illustrating angle change data of respective joint units according to time, stored in a memory unit of FIG. 6.

FIG. 6 is a flow chart illustrating a control method of a robot in accordance with another embodiment.

First, angle change data of respective joint units according to time, which are obtained using human walking data received from the input unit, are stored in the memory unit (Operation 410).

The human walking data are obtained using motion capture equipment, and are used as basic data to perform stable and natural walking control of the robot.

The angle change data of the respective joint units according to time, stored in the memory unit, are shown in FIGS. 7(a) to 7(f).

With reference to FIGS. 7(a) to 7(f), angle changes of the hip joint units, the knee joint units and the ankle joint units according to time using the human walking data are stored in the memory unit.

FIGS. 7(a) and 7(b) are graphs illustrating angle change forms of the left and right hip joint units according to time, FIGS. 7(c) and 7(d) are graphs illustrating angle changes of the left and right knee joint units according to time, and FIGS. 7(e) and 7(f) are graphs illustrating angle change forms of the left and right ankle joint units according to time.

Viewing the graphs of FIGS. 7(a) to 7(f), it may be seen that a period from a point t1 to a point t2 is one cycle Δt and similar graph forms of each of the joint units are periodically repeated.

For example, if a period from when the heel of the right foot of a human contacts the ground through a process in which the left leg supports the body of the human and then the right leg moves forward to when the heel of the right foot contacts again the ground is set to a walking cycle in standard walking, the angles of the respective joint units are repeatedly changed each control cycle (t1~t2).

When the angle change data of the respective joint units according to time using the human walking data are stored (Operation 410), reference walking trajectories of the robot are generated (Operation 420).

In more detail, the knot point extraction unit extracts reference knot points from the angle change data of the respective joint units according to time, stored in the memory unit, and the reference walking trajectory generation unit generates reference walking trajectories using the extracted reference knot points.

Here, the reference knot points are angle commands of the respective joint units to perform the next operating state. Extraction of the reference knot points is shown in FIG. 8

Figure 8:
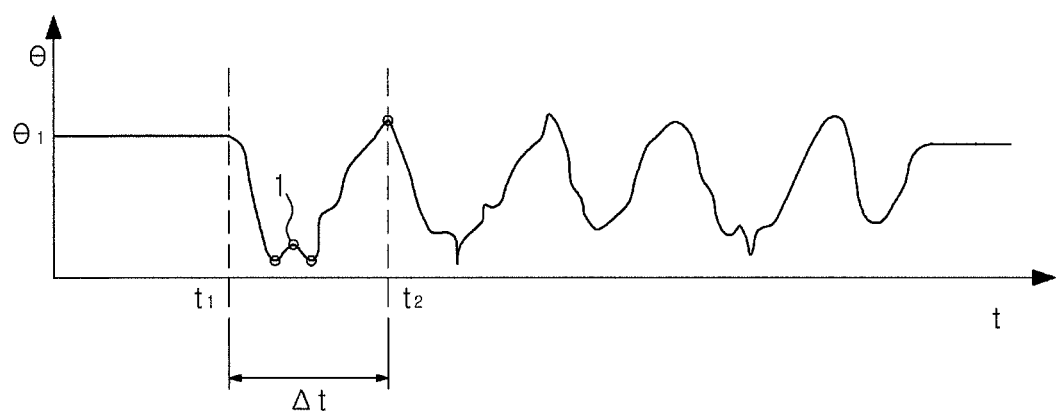
FIG. 8 is a graph illustrating extraction of knot points during generation of a reference walking trajectory of FIG. 6.

With reference to FIG. 8, a reference knot point 1 is set to a point where an angular velocity of each joint unit is changed from angle change data of each joint unit according to time. That is, the reference knot point 1 indicates a peak point where the angular velocity is '0', and three or four reference knot points 1 may be extracted in one cycle Δt.

Although this embodiment illustrates that the number of the reference knot points 1 extracted in one cycle Δt is three or four, the number of the reference knot points 1 may be greater or smaller than three or four.

The extracted reference knot points 1 are transmitted to the reference walking trajectory generation unit, and the reference walking trajectory generation unit generates a reference walking trajectory of each of the joint units of the robot by connecting reference knot points 1 by a spline. The generated reference walking trajectory is shown in FIG. 9.

Figure 9:
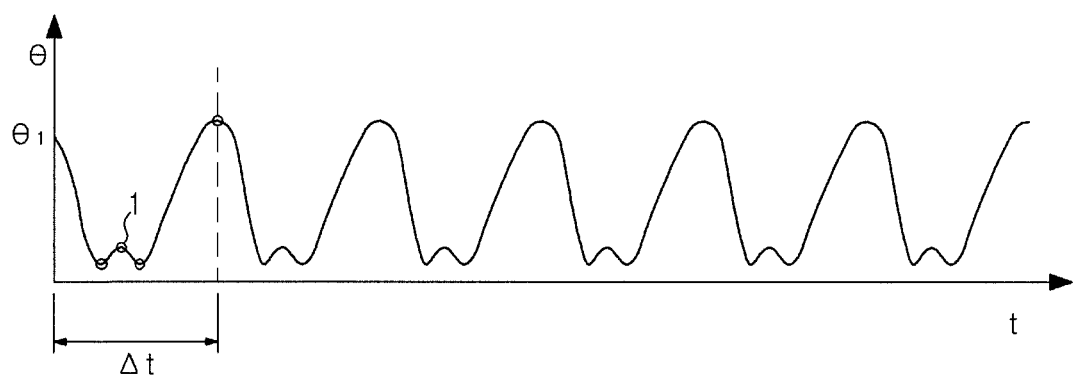
FIG. 9 is a graph illustrating generation of the reference walking trajectory using the extracted knot points of FIG. 8.

With reference to FIG. 9, the reference walking trajectory is generated so that an angle change form, obtained by smoothly connecting the extracted three or four reference knot points 1, is repeated each control cycle Δt.

When the reference walking trajectories of the robot are generated (Operation 420), the walking change factor calculation unit calculates a walking change factor to change the walking pattern of the robot (Operation 430).

The walking change factor includes a scale factor to change a walking stride and a walking cycle to change a walking velocity.

That is, the walking change factor calculation unit calculates the walking change factor to adjust the walking stride and walking velocity suitable to the current walking state of the robot.

The scale factor changes the magnitude of the angle θ of each joint in the reference walking trajectory, thereby increasing or decreasing the walking stride.

The angles of the respective joints decrease or increase in proportion to the changed walking stride. This embodiment changes the magnitudes of the angles of the joint units in the reference walking trajectories of standard walking using the scale factor, thereby achieving various walking strides of the robot.

The scale factor is set to be smaller than a value set in advance so that the changed walking stride is greater than the minimum walking stride of the robot. When the changed walking stride is smaller than the minimum walking stride, a foot contacts the ground while swing of the foot lifted from the ground occurs and thus walking of the robot may be impossible. That is, the scale factor is set to be smaller than the value set in advance in order to obtain the minimum swing angle of the foot.

The walking cycle is a period when standard walking is performed. When the walking cycle is shortened, the walking velocity is increased, and when the walking cycle is elongated, the walking velocity is decreased.

In this embodiment, the walking velocity is changed by shortening and elongating the walking cycle.

When the walking change factor is calculated (Operation 430), the target walking trajectory generation unit generates target walking trajectories by carrying out an arithmetic operation between the walking change factor and the reference walking trajectories (Operation 440).

That is, the target walking trajectory generation unit generates target walking trajectories which may achieve various walking strides and walking velocities suitable to the current walking state of the robot.

First, a process of generating a target walking trajectory with a changed walking stride will be described below.

The target walking trajectory generation unit carries out an arithmetic operation between the calculated scale factor and a reference knot point. The arithmetic operation between the scale factor and the reference knot point is carried out through Equation 1 below.

$$\theta_{d,i} = \theta_i / w, w \leq w_c \qquad \text{<Equation 2>}$$

Here, $\theta_{d,i}$ is a target knot point, $\theta_i$ is a reference knot point, w is a scale factor, and i means each joint unit. As shown in Equation 1, the target knot point $\theta_{d,i}$ is calculated by dividing an angle $\theta_i$ of the reference knot point by the scale factor w. That is, the target knot point is calculated by changing the magnitude of the reference knot point.

In more detail, as the scale factor w is increased, the target knot point having a decreased walking stride is calculated, and as the scale factor w is decreased, the target knot point having an increased walking stride is calculated.

The scale factor w is set to be smaller than the predetermined value $w_c$, as expressed in Equation 1, in order to obtain the minimum swing angle of a foot lifted from the ground. The predetermined value $w_c$ is calculated through experimentation and is stored in advance in the memory unit.

When the target knot points are calculated through the above Equation, the target walking trajectory generation unit generates target walking trajectories by smoothly connecting the calculated target knot points.

Figure 10A:
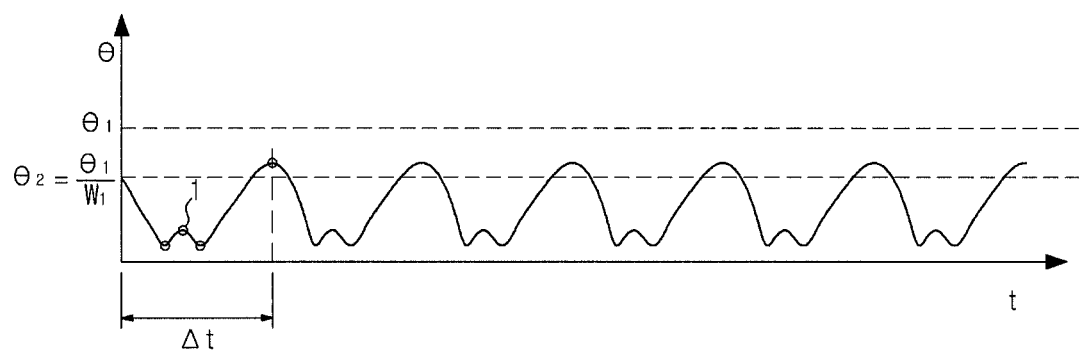
FIG. 10A is a graph illustrating a target walking trajectory with a changed walking stride.

A target walking trajectory with a changed walking stride generated by the above process is shown in FIG. 10A. With reference to FIG. 10A, it may be seen that as a result of the arithmetic operation between the reference walking trajectory and the scale factor $w_1$, the maximum value of the joint angle is converted from $\theta_1$ into $\theta_2$.

In this embodiment, in addition to generation of the above target walking trajectory having the changed walking stride, generation of a target walking trajectory having a changed walking velocity is possible. This will be described with reference to FIG. 10B.

The target walking trajectory generation unit changes the walking cycle corresponding to a period when standard walking is performed in the reference walking trajectory. That is, the walking cycle is converted from Δt into Δt', as shown in FIG. 10B.

In more detail, when the walking cycle is increased, the walking velocity is decreased, and when the walking cycle is decreased, the walking velocity is increased.

Figure 10B:
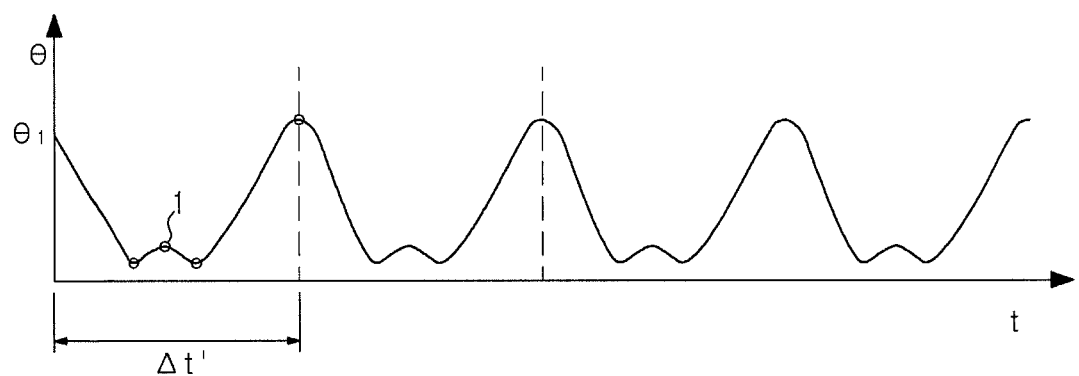
FIG. 10B is a graph illustrating a target walking trajectory with a changed walking velocity.

Further, in this embodiment, in addition to change of either the walking stride or the walking velocity, as shown in FIGS. 10A and 10B, both the walking stride and the walking velocity may be changed so as to achieve more various walking attitudes.

For example, when the walking cycle is increased and the scale factor is increased, a target walking trajectory which achieves low-velocity walking using a short walking stride is generated, and when the walking cycle is decreased and the scale factor is increased, a target walking trajectory which achieves high-velocity walking using a long walking stride is generated.

Figure 11:
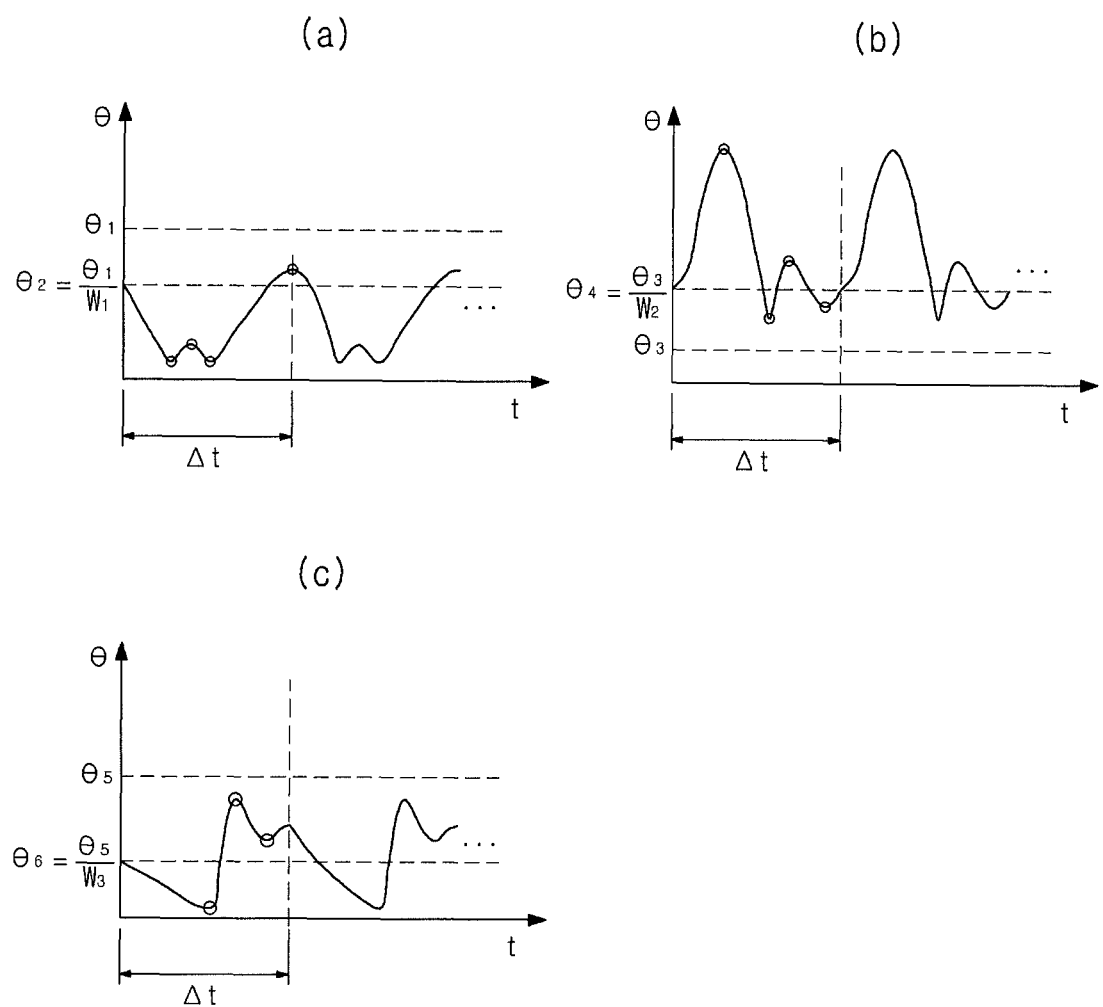
FIGS. 11(a) to 11(c) are graphs illustrating target walking trajectories of the respective joint units with differently changed walking strides.

Further, in this embodiment, the same scale factor may be applied to the respective joint units, as shown in FIG. 10A, and different scale factors may be applied to the respective joint units so as to generate a wider variety of target walking trajectories, as shown in FIGS. 11(*a*) to 11(*b*).

That is, different scale factors of the hip joint units, the knee joint units and the ankle joint units are calculated and target walking trajectories are generated using the calculated scale factors, thereby achieving various walking attitudes.

When the target walking trajectories are generated through the above process (Operation 440), the control torque calculation unit calculates control torques to track the generated target walking trajectories (Operation 450).

The control torque calculation unit calculates control torques to track the target walking trajectories of the respective joint units, and such a calculation of the control torques is carried out through a Proportional-Integral-Derivative (PID) control method, as expressed in Equation 2.

$$\tau_i = k_{p,i}(\theta_d - \theta_c) + k_{t,i}\int_0^t(\theta_d - \theta_c)dt + k_{d,i}(\theta'_d - \theta'_c) \quad \text{<Equation 2>}$$

In Equation 2, $\tau_1$ is a torque value each control cycle, $\theta_d$ and $\theta'_d$ are a target angle and an angular velocity each control cycle, $\theta_c$ and $\theta'_c$ are a current angle and an angular velocity each control cycle, $k_{p,i}$, $k_{t,i}$ and $k_{d,i}$ are coefficients, and i means each joint. Therefore, a control torque of each joint may be calculated.

Such a calculation of the control torques is carried out each control cycle, and the control cycle is set to 1 ms.

When the control torque calculation unit calculates the control torques (Operation 450), the servo control unit supplies the control torques to the corresponding joint units (Operation 460) so as to drive actuators, such as motors, installed on the joint units, thereby allowing the robot to achieve various and natural walking attitudes along the target walking trajectories.

Figure 12:
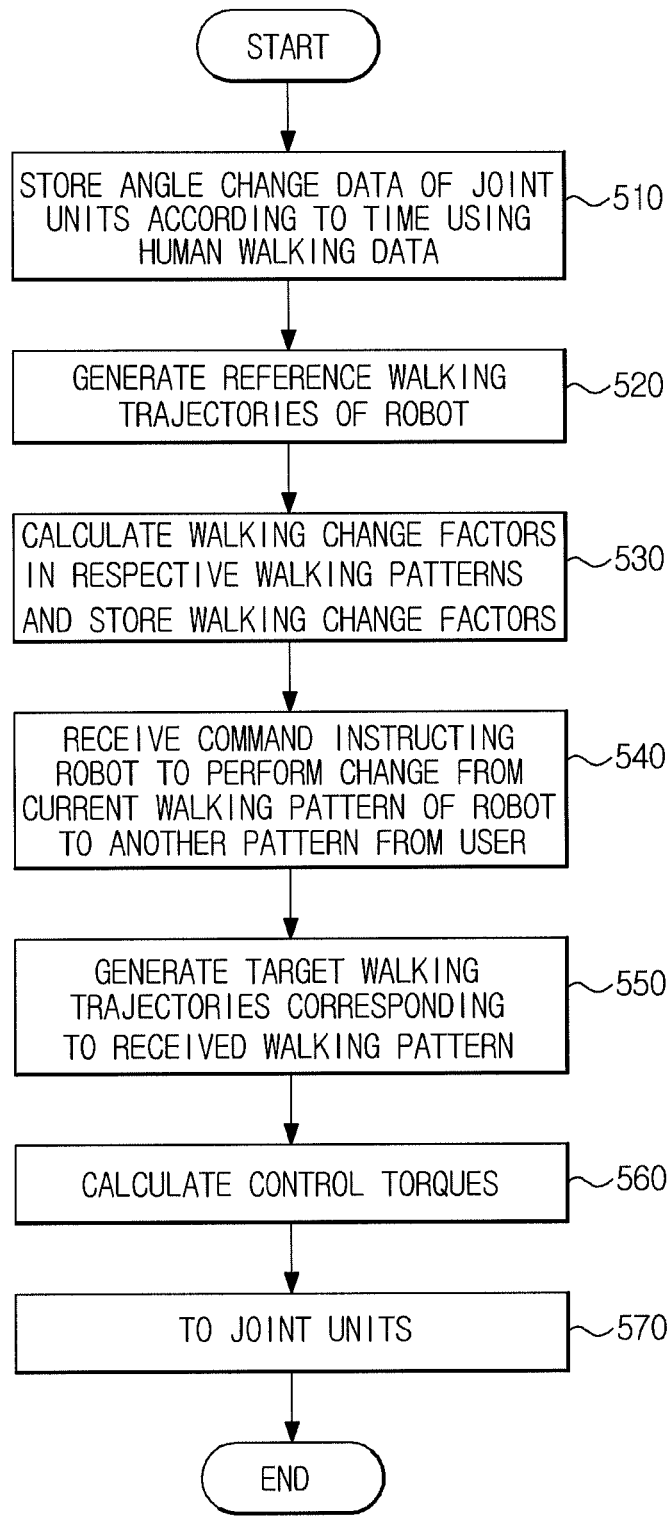
FIG. 12 is a flow chart illustrating a control method of a robot in accordance with a further embodiment.

FIG. 12 is a flow chart illustrating a control method of a robot in accordance with a further embodiment.

First, angle change data of the respective joint units according to time using human walking data received from the input unit are stored in the memory unit (Operation 510).

Thereafter, reference walking trajectories of the robot are generated using the angle change data of the respective joint units according to time stored in the memory and are then stored in the memory unit (Operation 520).

In more detail, the knot point extraction unit extracts reference knot points from the angle change data of the respective joint units according to time, stored in the memory unit, and transmits the reference knot points to the reference walking trajectory generation unit. The reference walking trajectory generation unit generates reference walking trajectories by smoothly connecting the transmitted extracted reference knot points by splines, and the generated reference walking trajectories are stored in the memory unit.

When the reference walking trajectories of the robot are generated (Operation 520), the walking change factor calculation unit calculates scale factors to change a walking stride and walking cycles to change a walking velocity in respective walking patterns (Operation 530).

For example, a scale factor, to change a standard walking pattern to a first walking pattern having a short walking stride, and first walking pattern data may be stored in the memory unit. Further, a scale factor, to change the standard walking pattern to a second walking pattern having a low velocity and a short walking stride, second walking pattern data and a walking cycle corresponding to the second walking pattern data may be stored in the memory unit. Further, a third walking pattern to achieve various walking attitudes of the robot using different scale factors applied to the respective joint units may be stored in the memory unit.

That is, the walking change factor calculation unit calculates walking change factors corresponding to various walking pattern data, and the calculated walking change factors and the corresponding walking pattern data are stored in the memory unit.

When the walking change factors are calculated and stored (Operation 530), the user interface unit receives a command instructing the robot to change the current walking pattern to another walking pattern from a user (Operation 540). The target walking trajectory generation unit generates target walking trajectories to change the current walking pattern into the walking pattern received from the user interface unit (Operation 550).

For example, the user may input a command, instructing the robot to change the current walking pattern to another walking pattern, to the robot through the user interface unit based on data regarding various walking patterns stored in advance in the memory unit (Operation 540).

If the robot receives a command instructing the robot to change the first walking pattern to the second walking pattern through the user interface unit (Operation 540), the target walking trajectory generation unit reads the walking change factor stored in the memory unit corresponding to the second walking pattern and generates target walking trajectories by carrying out an arithmetic operation between the walking change factor and the reference walking trajectories (Operation 550).

When the target walking trajectories are generated (Operation 550), the control torque calculation unit calculates control torques to track the generated target walking trajectories (Operation 560).

Thereafter, the servo control unit supplies the calculated control torques to the corresponding joint units (Operation 570), and the joint units drives the actuators, such as motors, using the received control torques, thereby performing walking along the target walking trajectories.

As is apparent from the above description, in a walking robot and a control method thereof in accordance with an embodiment, various walking patterns are performed through a comparatively simple arithmetic operation process.

Further, target walking trajectories to achieve the various walking patterns allow the robot to have a natural gait similar to that of a human. Because the target walking trajectories are generated based on human walking data and human biomechanics are reflected in the target walking trajectories.

Further, the walking robot in accordance with an embodiment performs walking based on FSM control and torque servo control, thus being capable of walking at low servo gain, thereby reducing energy consumption.

Further, the low servo gain lowers stiffness of respective joints of the robot, thereby reducing impact when the robot collides with a surrounding environment.

Moreover, a humanoid robot walking with stretched knees is manufactured and similarity of the robot to a human is enhanced.

The embodiments can be implemented in computing hardware and/or software, such as (in a non-limiting example) any computer that can store, retrieve, process and/or output data and/or communicate with other computers. For example, walking control unit 340 in FIG. 4 may include a computer to perform calculations and/or operations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A control method of a walking robot, which has at least one joint unit provided on each leg of the robot, comprising:

storing angle change data according to time corresponding to the at least one joint unit in advance using human walking data;

extracting reference knot points from the stored angle change data according to time, each reference knot point being a point where an angular velocity of a respective joint unit of the at least one joint unit is changed and indicating a peak point where the angular velocity is zero, and generating a reference walking trajectory of the robot using the extracted reference knot points;

calculating, by a computer, a walking change factor to perform change between walking patterns of the robot, the walking change factor including a scale factor to change a walking stride of the robot;

generating, by a computer, a target walking trajectory by carrying out an arithmetic operation between the generated reference walking trajectory and the calculated walking change factor;

calculating, by a computer, a control torque to track the generated target walking trajectory; and transmitting the calculated control torque to the at least one joint unit so as to control walking of the robot.

2. The control method according to claim 1, wherein the walking change factor further includes a walking cycle to change a walking velocity of the robot.

3. The control method according to claim 1, wherein said generating a target walking trajectory includes:

calculating target knot points by carrying out an arithmetic operation between the reference knot points and the scale factor; and generating the target walking trajectory by connecting the calculated target knot points by a spline.

4. The control method according to claim 3, wherein said calculating target knot points is carried out by dividing the reference knot points by the scale factor.

5. The control method according to claim 1, wherein:

the at least one joint unit provided on each leg includes a hip joint unit, a knee joint unit and an ankle joint unit; and the scale factor is set with respect to each of the hip joint unit, the knee joint unit and the ankle joint unit.

6. The control method according to claim 1, wherein the scale factor is set so that the changed walking stride is greater than a minimum walking stride of the robot.

7. The control method according to claim 1, wherein said generating a reference walking trajectory generates the reference walking trajectory by connecting the extracted reference knot points by a spline.

8. A control method of a walking robot, which has at least one joint unit provided on each leg of the robot, comprising:

storing angle change data according to time corresponding to the at least one joint unit in advance using human walking data;

extracting reference knot points from the stored angle change data according to time, each reference knot point being a point where an angular velocity of a respective joint unit of the at least one joint unit is changed and indicating a peak point where the angular velocity is zero, and generating a reference walking trajectory of the robot using the extracted reference knot points, and storing the generated reference walking trajectory in advance;

calculating walking change factors to perform change between walking patterns of the robot and storing the calculated walking change factors in advance, each of the walking change factors including a scale factor to change a walking stride of the robot;

receiving a command instructing the robot to perform change from a current walking pattern of the robot to another walking pattern from a user;

generating a target walking trajectory to perform change from the current walking pattern of the robot to said another walking pattern by carrying out an arithmetic operation between the generated reference walking trajectory and a walking change factor of the stored, calculated walking change factors corresponding to said another walking pattern;

calculating a control torque to track the generated target walking trajectory; and transmitting the calculated control torque to the at least one joint unit so as to control walking of the robot.

9. The control method according to claim 8, wherein each of the walking change factors further includes a walking cycle to change a walking velocity of the robot.

10. The control method according to claim 8, wherein said generating a target walking trajectory includes:

calculating target knot points by carrying out an arithmetic operation between the reference knot points and the scale factor included in said walking change factor of the stored, calculated walking change factors corresponding to said another walking pattern; and generating the target walking trajectory by connecting the calculated target knot points by a spline.

11. The control method according to claim 10, wherein said calculating target knot points is carried out by dividing the reference knot points by the scale factor included in said walking change factor of the stored, calculated walking change factors corresponding to said another walking pattern.

12. The control method according to claim 8, wherein:

the at least one joint unit provided on each leg includes a hip joint unit, a knee joint unit and an ankle joint unit; and the scale factor is set with respect to each of the hip joint unit, the knee joint unit and the ankle joint unit.

13. The control method according to claim 8, wherein the scale factor is set so that the changed walking stride is greater than a minimum walking stride of the robot.

14. The control method according to claim 8, wherein said generating a reference walking trajectory generates the reference walking trajectory of the robot by connecting the extracted reference knot points by a spline.

15. A walking robot comprising:

at least one joint unit provided on each leg of the robot;

a memory unit to store angle change data according to time corresponding to the at least one joint unit in advance using human walking data;

a knot point extraction unit to extract reference knot points from the stored angle change data according to time, each reference knot point being a point where an angular velocity of a respective joint unit of the at least one joint unit is changed and indicating a peak point where the angular velocity is zero;

a reference walking trajectory generation unit to generate a reference walking trajectory of the robot using the extracted reference knot points;

a walking change factor calculation unit to calculate a walking change factor to perform change between walking patterns of the robot, the calculated walking change factor including a scale factor to change a walking stride of the robot;

a target walking trajectory generation unit to generate a target walking trajectory by carrying out an arithmetic operation between the generated reference walking trajectory and the calculated walking change factor;

a control torque calculation unit to calculate a control torque to track the generated target walking trajectory; and a servo control unit to transmit the calculated control torque to the at least one joint unit so as to control walking of the robot.

16. The walking robot according to claim 15, wherein calculated walking change factor further includes a walking cycle to change a walking velocity of the robot.

17. The walking robot according to claim 15, wherein the target walking trajectory generation unit calculates target knot points by carrying out an arithmetic operation between the reference knot points and the scale factor, and generates the target walking trajectory by connecting the calculated target knot points by a spline.

18. The walking robot according to claim 17, wherein the target walking trajectory generation unit calculates the target knot points by dividing the reference knot points by the scale factor.

19. The walking robot according to claim 15, wherein:

the at least one joint unit provided on each leg includes a hip joint unit, a knee joint unit and an ankle joint unit; and the walking change factor calculation unit calculates the scale factor of each of the hip joint unit, the knee joint unit and the ankle joint unit.

20. The walking robot according to claim 15, wherein the walking change factor calculation unit sets the scale factor so that the changed walking stride is greater than a minimum walking stride of the robot.

21. A walking robot comprising:

a user interface unit to receive a command instructing the robot to perform change from a current walking pattern of the robot to another walking pattern from a user;

at least one joint unit provided on each leg of the robot;

a memory unit to store angle change data according to time corresponding to the at least one joint unit using human walking data;

a knot point extraction unit to extract reference knot points from the stored angle change data according to time, each reference knot point being a point where an angular velocity of a respective joint unit of the at least one joint unit is changed and indicating a peak point where the angular velocity is zero;

a reference walking trajectory generation unit to generate a reference walking trajectory of the robot using the extracted reference knot points and to transmit the generated reference walking trajectory to the memory unit so that the generated reference walking trajectory is stored in the memory unit;

a walking change factor calculation unit to calculate walking change factors to perform change between walking patterns of the robot and to transmit the calculated walking change factors to the memory unit so that the calculated walking change factors are stored in the memory unit, each of the calculated walking change factors including a scale factor to change a walking stride of the robot;

a target walking trajectory generation unit to generate a target walking trajectory to perform change from the current walking pattern of the robot to said another walking pattern by carrying out an arithmetic operation between the generated reference walking trajectory and a walking change factor of the stored, calculated walking change factors corresponding to said another walking pattern;

a control torque calculation unit to calculate a control torque to track the generated target walking trajectory; and a servo control unit to transmit the calculated control torque to the at least one joint unit so as to control walking of the robot.

22. The walking robot according to claim 21, wherein each of the calculated walking change factors includes a walking cycle to change a walking velocity of the robot.

23. The walking robot according to claim 21, wherein:

the at least one joint unit provided on each leg includes a hip joint unit, a knee joint unit and an ankle joint unit; and the walking change factor calculation unit calculates the scale factor of each of the hip joint unit, the knee joint unit and the ankle joint unit.

24. The walking robot according to claim 21, wherein the walking change factor calculation unit sets the scale factor so that the changed walking stride is greater than a minimum walking stride of the robot.

25. The walking robot according to claim 21, wherein the target walking trajectory generation unit calculates target knot points by carrying out an arithmetic operation between the reference knot points and the scale factor, and generates the target walking trajectory by connecting the calculated target knot points by a spline.

26. The walking robot according to claim 25, wherein the target walking trajectory generation unit calculates the target knot points by dividing the reference knot points by the scale factor.

* * * * *